United States Patent
Vermeylen et al.

(10) Patent No.: US 6,646,700 B2
(45) Date of Patent: Nov. 11, 2003

(54) MONOCHROME LIQUID CRYSTAL DISPLAY DEVICE UTILIZING A COLOR FILTER FOR CHANGING THE SPECTRUM OF LIGHT EMITTED FROM A LIQUID CRYSTAL PANEL

(75) Inventors: Dirk Vermeylen, Mechelen (BE); Paul Wouters, Borgerhout (BE)

(73) Assignee: Agfa-Gevaert, Motsel (BE)

( * ) Notice: Subject to any disclaimer, the term of this patent is extended or adjusted under 35 U.S.C. 154(b) by 73 days.

(21) Appl. No.: 10/012,670

(22) Filed: Oct. 30, 2001

(65) Prior Publication Data

US 2002/0063821 A1 May 30, 2002

Related U.S. Application Data

(60) Provisional application No. 60/258,706, filed on Dec. 28, 2000.

(30) Foreign Application Priority Data

Nov. 24, 2000 (EP) .............................................. 00204176

(51) Int. Cl.⁷ .............................................. G02F 1/1335
(52) U.S. Cl. ............................................................ 349/106
(58) Field of Search ............................ 349/106, 2, 104, 349/108

(56) References Cited

U.S. PATENT DOCUMENTS

| | | | | |
|---|---|---|---|---|
| 4,678,285 A | * | 7/1987 | Ohta et al. | 349/71 |
| 5,128,782 A | | 7/1992 | Wood | |
| 5,649,244 A | * | 7/1997 | Sato et al. | 396/287 |
| 5,929,962 A | * | 7/1999 | Chiu et al. | 349/187 |
| 6,317,180 B1 | * | 11/2001 | Kuroiwa et al. | 349/96 |

FOREIGN PATENT DOCUMENTS

| | | | | |
|---|---|---|---|---|
| EP | 0 590 511 A1 | | 4/1994 | |
| EP | 00 20 4176 | | 4/2001 | |
| JP | 11-316372 A | * | 11/1999 | G02F/1/1335 |
| JP | 2000-284315 A | * | 10/2000 | G02F/1/1347 |

* cited by examiner

*Primary Examiner*—Carl Whitehead, Jr.
*Assistant Examiner*—Stephen W. Smoot
(74) *Attorney, Agent, or Firm*—John A. Merecki; Hoffman, Warnick & D'Alessandro

(57) ABSTRACT

A monochrome liquid crystal display device comprises a layer of liquid crystals (1) and a light source (6) arranged for uniformly illuminating the liquid crystal layer. A color filter (8) is provided for changing the spectrum of the light emitted by the liquid crystal display device.

6 Claims, 7 Drawing Sheets

MONOCHROME LIQUID CRYSTAL DISPLAY DEVICE UTILIZING A COLOR FILTER FOR CHANGING THE SPECTRUM OF LIGHT EMITTED FROM A LIQUID CRYSTAL PANEL

The application claims the benefit of U.S. Provisional Application No. 60/258,706 filed Dec. 28, 2000.

FIELD OF THE INVENTION

The present invention relates to display devices. More specifically the invention relates to monochrome liquid crystal display devices for use in medical applications, such as radiographic diagnosis.

BACKGROUND OF THE INVENTION

In radiographic diagnosis it has been common practice for very many years to use photographic film as a medium for recording a radiographic image. Diagnosis is performed by examining the image on the film when placed on a light box.

The film medium is being used for primary diagnosis as well as for communication between radiologist, physicians, doctors, patients and others. The film is furthermore used as an archiving medium.

Several film types have been used. A distinction between the different film types can be made on the basis of the inherent color of the film base. One can distinguish between clear base film and blue base films.

Among radiologist so-called blue base film has become a standard. In order to obtain a blue base radiographic film a blue dye has been added to the substrate of the radiographic film. (see Technik der Röntgendiagnostik, Hanno Poppe, Georg Thieme Verlag, Stuttgart, 1961, p. 571). Blue base film is far more frequently used than clear base film, the use of which has become rather limited.

Although the technical reasons for the claimed advantages of blue base radiographic film are far from convincing, it is a fact that the blue color of the film is considered an aid to diagnosis (see Radiographic processing, D. H. O. John, Focal Press London, page 238–239). Advantages of this so-called blue base film are described by radiologists as 'cleaner', 'less fatiguing', 'cold', 'sharper' and 'with more contrast perception'.

With the introduction of Picture Archiving and Communication Systems (PACS) and workstation based applications such as computed radiography (CR), magnetic resonance (MR), computed tomography (CT) etc. cathode ray tube (CRT) monitors have more and more been used as a replacement for film.

In order to be able to perform diagnosis of the image displayed on the monitor, specific monitors have been developed and introduced in this market in order to meet the high standards.

Typically, these monitors are high resolution monochrome (grayscale) monitors. Pixels are not formed by addressing a red, green and blue subpixel in various intensity combinations like it is done on color monitors, but by directly writing with an electron beam on the CRT phosphor, without passing through a grid. In this way, higher resolutions can be obtained. However, a consequence is that in such a monitor only one type of phosphor is used to generate the light.

For medical applications, in most cases one of the following two phosphor types are currently being used in these monitors: the P104 and the P45 phosphor.

A P104 phosphor produces a light color, which is very close to neutral white.

A P45 phosphor produces a more blue-like light. The P45 phosphor has been used to generate an overall image look that resembles the overall image look which the radiologist is used to have when he is diagnosing radiographic images on blue-base film.

One of the latest developments in the softcopy environment, is the use of flat panel displays on the basis of liquid crystals.

The development of the technology of grayscale flat panels is leading to an increased use of the medium for diagnostic and viewing applications. The more the quality of these products is improved, the more they will replace the currently used medical grayscale CRT monitors.

The technology of grayscale flat panel display devices is based on another principle than that of CRT monitors.

In these display devices chemical crystals are applied that within a given temperature range (−5° C.–+65° C.) act as anisotrope fluidum whereas above this temperature range they become a clear isotrope fluidum.

In the anistrope range the optical characteristics of these crystals can be changed by applying an electrical field.

In absence of this electrical field, the material is clear whereas at ca. 1 MV/m the material becomes turbid and does no longer transmit light.

The fact that these crystals may act as light valves for the light of an illuminating light source (occasionally provided with a light diffuser) placed behind the layer of liquid crystals is used when building display devices by means of these so-called 'liquid crystals'.

A liquid crystal display device commonly consists of two spaced glass panels in between which a thin layer of liquid crystals is applied. The glass panels are usually covered with a transparent electrode layer which may be patterned in such a way that an array of pixels is created. By energizing the electrodes the liquid crystal layer can be made locally turbid.

Two addressing systems are used to drive the display device: either a passive or an active system.

In the passive system the two electrode layers are patterned in a regular array of stripes. The stripes on one panel are perpendicular to those on the other panel.

The application of a voltage across two opposing stripes causes a change in the optical properties of the liquid crystal material situated at the crossing point of the two stripes, resulting in a change of light transmission through the energized pixels.

In an active system, which greatly improves the performance of the liquid crystal display device, each pixel has its own individual microelectronic switch. This means that such a microswitch is connected to an individual transparent pixel electrode, the planar size of which defines the size of the pixel. The microswitches are individually addressable. Three terminal or two-terminal switching elements exist. Three terminal switches are formed by thin film transistors arrayed in a matrix pattern on one glass platen which together with a glass platen carrying a transparent uniform (non-patterned) electrode layer forms a gap which is filed with the liquid crystal material. In case of a two-terminal switch such as a diode the second platen must also be patterned.

Monochrome as well as color liquid crystal display devices exist.

To impart color reproduction capability to the liquid crystal display device a color filter array element is provided on one of the two glass platens. In an active matrix display device, the color filter is usually provided on the glass platen not carrying the switching elements.

A color filter array for full color reproduction is composed of patches of three primary colors red, green and blue arranged in a given order. For contrast enhancement the color patches may be separated by black contour line patterns delineating the individual color filters.

In order to prevent loss of effective voltage over the liquid crystal material, the color filter is preferably kept out of the electrical circuit, which means that the transparent electrode is deposited on top of the color filter array element.

U.S. Pat. No. 5,128,782 discloses another embodiment of a color liquid crystal display device. The device comprises a liquid crystal display panel. Behind the panel are three flash tubes. The flash tubes are used for sequentially illuminating the panel with three primary colors. For this purpose in front of each of the flash tubes either a red or a green or a blue color filter is provided.

Color separation images of an image to be displayed are generated and applied to the display device. First the red separation image is displayed. For this purpose the red image is retrieved from memory and the transparency of pixels of successive lines of the liquid crystal display panel is controlled in accordance with the data of the red color separation image.

Next the procedure is continued for the green and the blue color separation images.

In medical diagnosis high resolution is extremely important. Another very important aspect is contrast. Monochrome liquid crystal display devices provide increased luminance which results in increased contrast and are therefore preferred over color liquid crystal display devices.

Another element which is very important to make medical diagnosis as reliable as possible is the consistency of the overall outlook of medical (radiographic) images.

A radiologist must be presented with images the overall outlook of which resembles as much as possible the outlook he is trained to see and is expected to see.

In this way it is avoided that his attention would be distracted by overall changed aspects of the image such as a different background color of the image rather than by elements that are of real importance for the diagnosis.

However, the monochrome liquid crystal display devices presently on the market produce a gray shade that is clear-base like because of the spectrum of the light source that is used in such a monochrome liquid crystal display device.

Hence, the image that is displayed on a monochrome liquid crystal display devices does not correspond with the characteristics of the image which the radiologist is used to diagnose. It does not resemble the blue base radiographic film, nor does it resemble the image on a CRT monitor employing a P45 phosphor.

This fact is generally not appreciated by the radiologists.

OBJECTS OF THE INVENTION

It is an object of the invention to provide a monochrome liquid crystal display device that is adapted for use in the field of medical diagnosis on displayed radiographic images.

Further object will become apparent from the description hereafter.

SUMMARY OF THE INVENTION

The above mentioned objects are realized by a monochrome liquid crystal display device having the specific features defined in claim 1.

A monochrome liquid crystal display device according to the present invention comprises a liquid crystal panel comprising a layer (1) of liquid crystals and a light source (6) arranged for uniformly illuminating the layer (1) of liquid crystals. A color filter (8) is provided for changing the spectrum of the light emitted by said liquid crystal panel.

Preferably the color filter has a spectrum such that the color co-ordinates of the light emitted by the liquid crystal display device correspond with the color co-ordinates of the blue base of a photographic film.

In a specific embodiment the color filter is the blue base of a photographic film.

The color filter is preferably provided between the light source and a viewer. Different positions are possible.

The characteristics of a filter for changing the spectrum of the light emitted by a monochrome liquid crystal display device can be determined as follows.

First the spectrum of the monochrome liquid crystal display device is measured without a filter being present and the color co-ordinates in a predefined color space such as 1931 CIE standard color space, are calculated. The result is referred to as color A.

Next, the spectrum of a blue base of a photographic film is measured on the same light-box. The color co-ordinates in the same color space are calculated. The result is referred to as color B.

Next a filter is calculated having a spectrum C so that color A applied with the filter C can be perceived by the human eye as color B.

Specific features for preferred embodiments of the invention are set out in the dependent claims.

The display device of the present invention is advantageous because it provides an acceptable compromise between two requirements set by the radiologists, namely (1) the need for high contrast which is nowadays provided by monochrome liquid crystal display devices and (2) the need for a displayed image that maximally resembles the overall look of the images the radiologist has been used to see on either radiographic film or on a CRT display device.

Further advantages and embodiments of the present invention will become apparent from the following description and drawings.

DETAILED DESCRIPTION OF THE INVENTION

Figure 1:
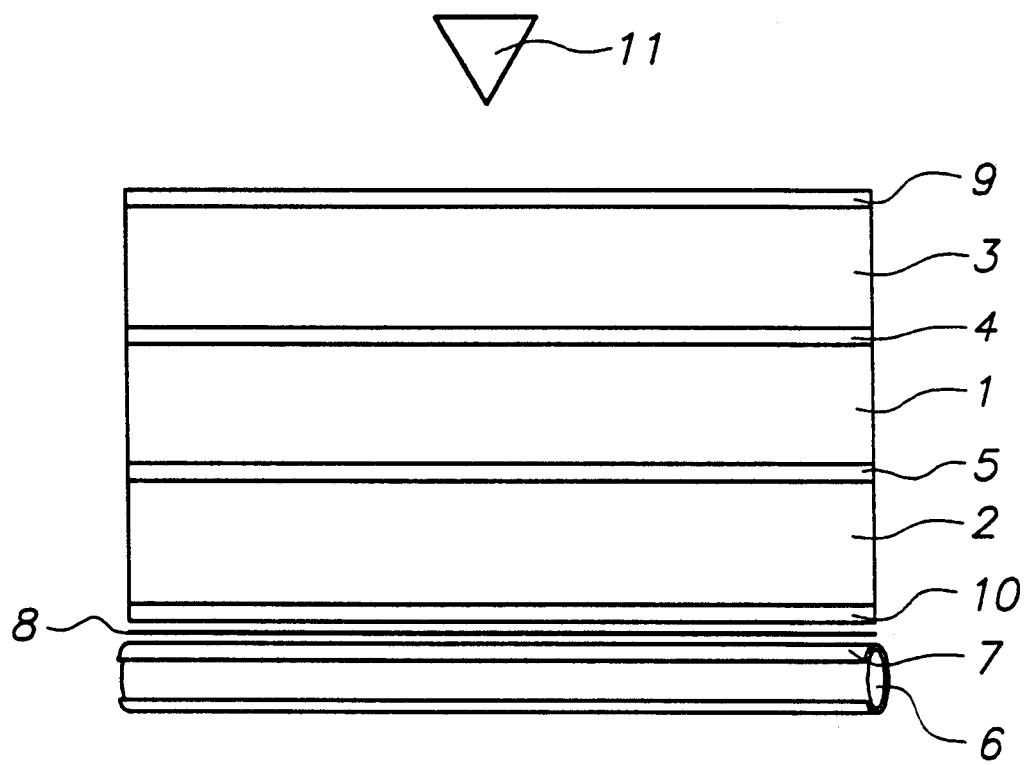
FIG. 1 shows an embodiment of a monochrome liquid crystal display device according to the present invention.

FIG. 1 illustrates an embodiment of a liquid crystal display device according to the present invention. The display device comprises a liquid crystal panel comprising a layer of liquid crystals 1 between a first platen 2 and a second platen 3.

In order to enable addressing of individual pixels of the liquid crystal layer an electrode assembly e.g. comprising transparent electrode layers 4 and 5 can be provided. The addressing of the electrode assembly is controlled by an electronic signal representation of an image to be displayed.

Light polarising layers are indicated by numerals 9 and 10.

A light source 6 is arranged to illuminate the liquid crystal layer 1. In the embodiment shown the light is emitted by back light source 6. The emitted light is guided and diffused by a light diffuser 7. In an alternative embodiment reflection illumination can be provided.

According to the present invention a color filter 8 is provided to modify the spectrum of the light transmitted by the liquid crystal panel. The color filter is provided in the optical path between the light source 6 and a viewer 11. More specifically, in this embodiment the color filter is provided in between the light source 6 and glass platen 2.

This embodiment is preferred because the viewing screen of the liquid crystal display device which is generally designed to absorb ambient light very well and hence to avoid reflections, is not affected by the provision of the filter.

Alternatively the color filter is provided in front of glass platen 3 and polarizes 9, e.g. in front of the viewing screen of the display device. This embodiment is advantageous in that existing display devices can be adapted according to the present invention without the need for opening the display device and modifying the internal construction of the device.

In a particular embodiment the color filter consist of the blue base of a photographic film which is a thin blue colored polyester film.

The film may be clamped to the housing of the display device, alternatively it may be adhered by colorless, transparent glue to the screen of the display device. Still alternative means of adhering the film to the display screen may be envisaged.

Figure 2:
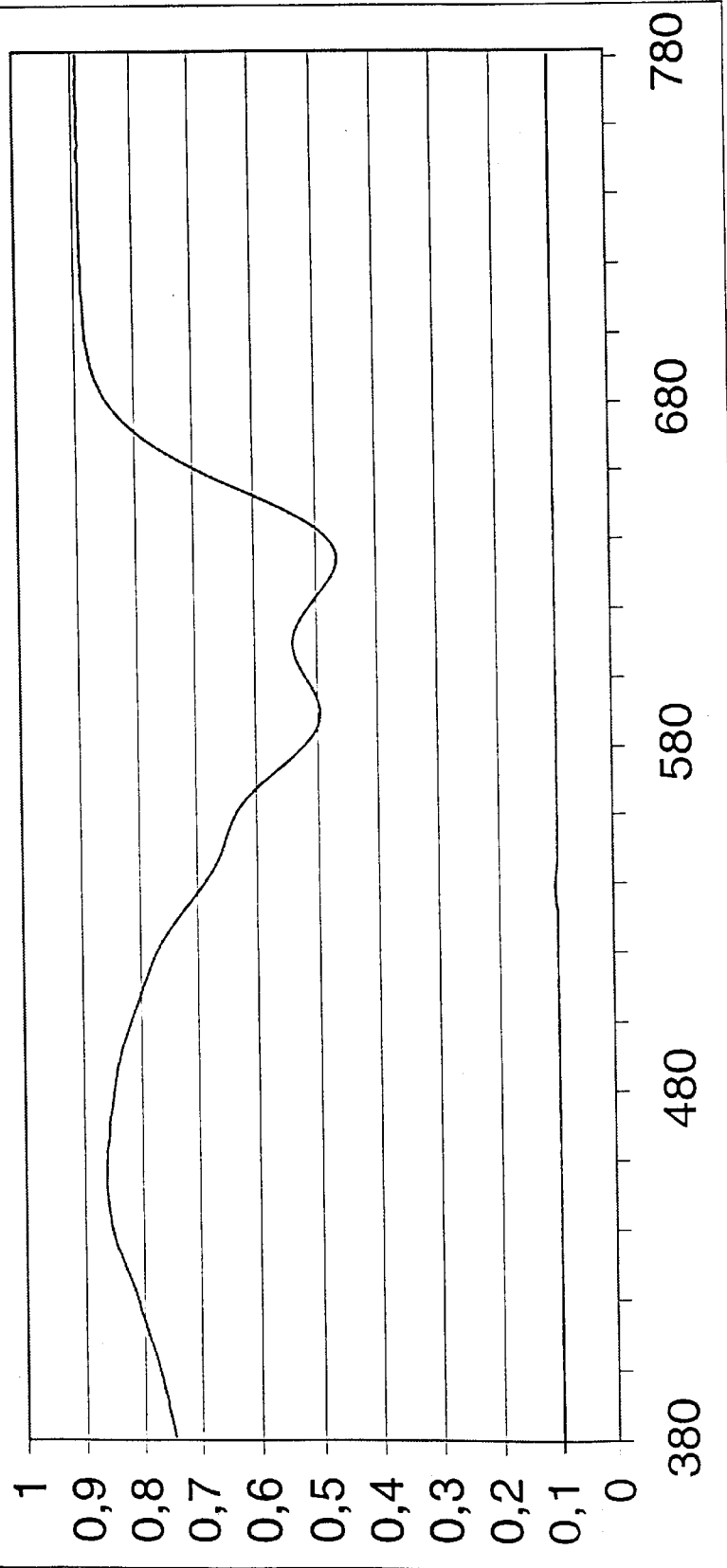
FIG. 2 shows the spectral response characteristic of an example of a color filter.

In FIG. 2 the spectrum of the light emitted by a display device was measured in absence of any color filter.

Figure 3:
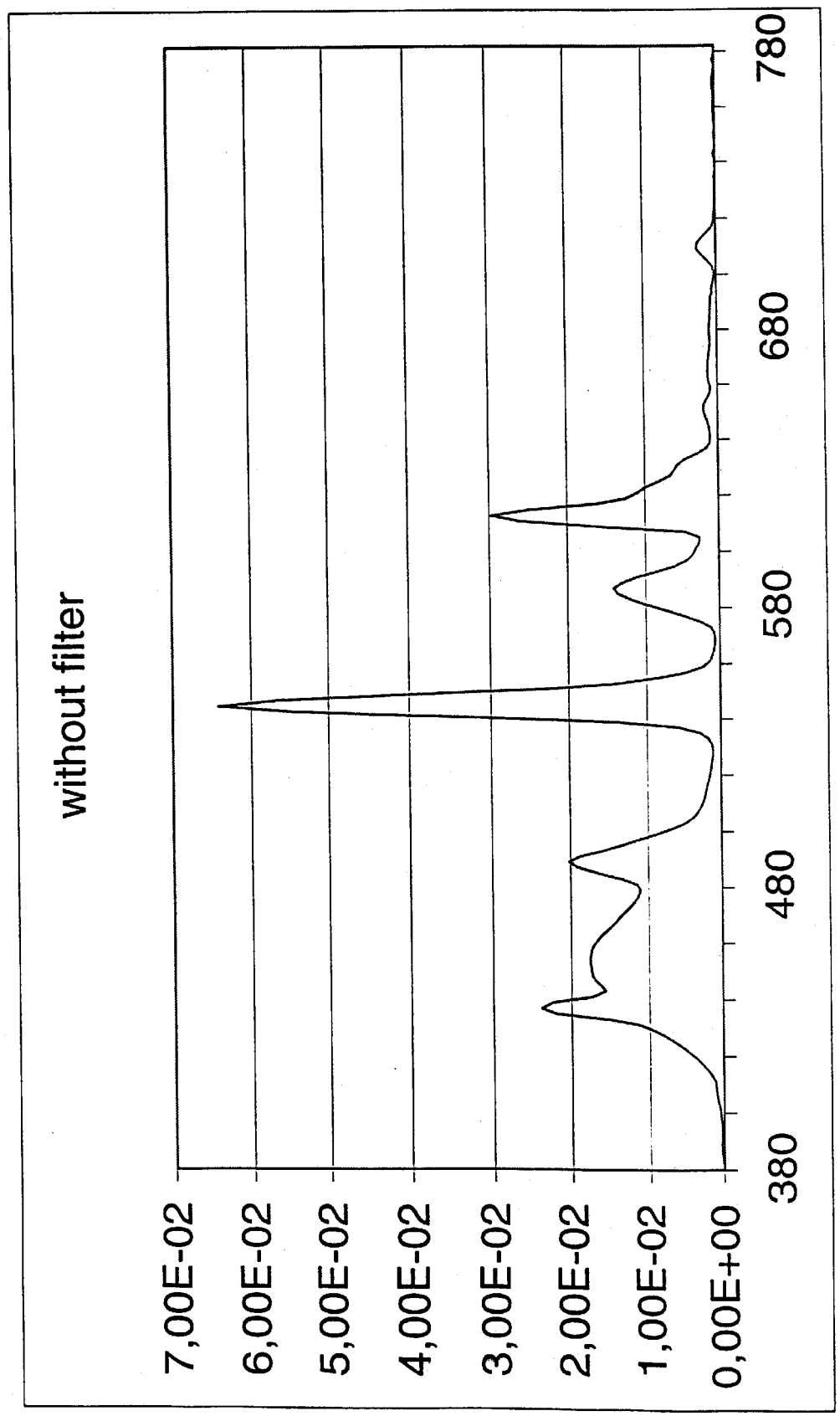
FIG. 3 shows the spectrum of the light emitted by a prior art liquid crystal display device without filter.
Figure 4:
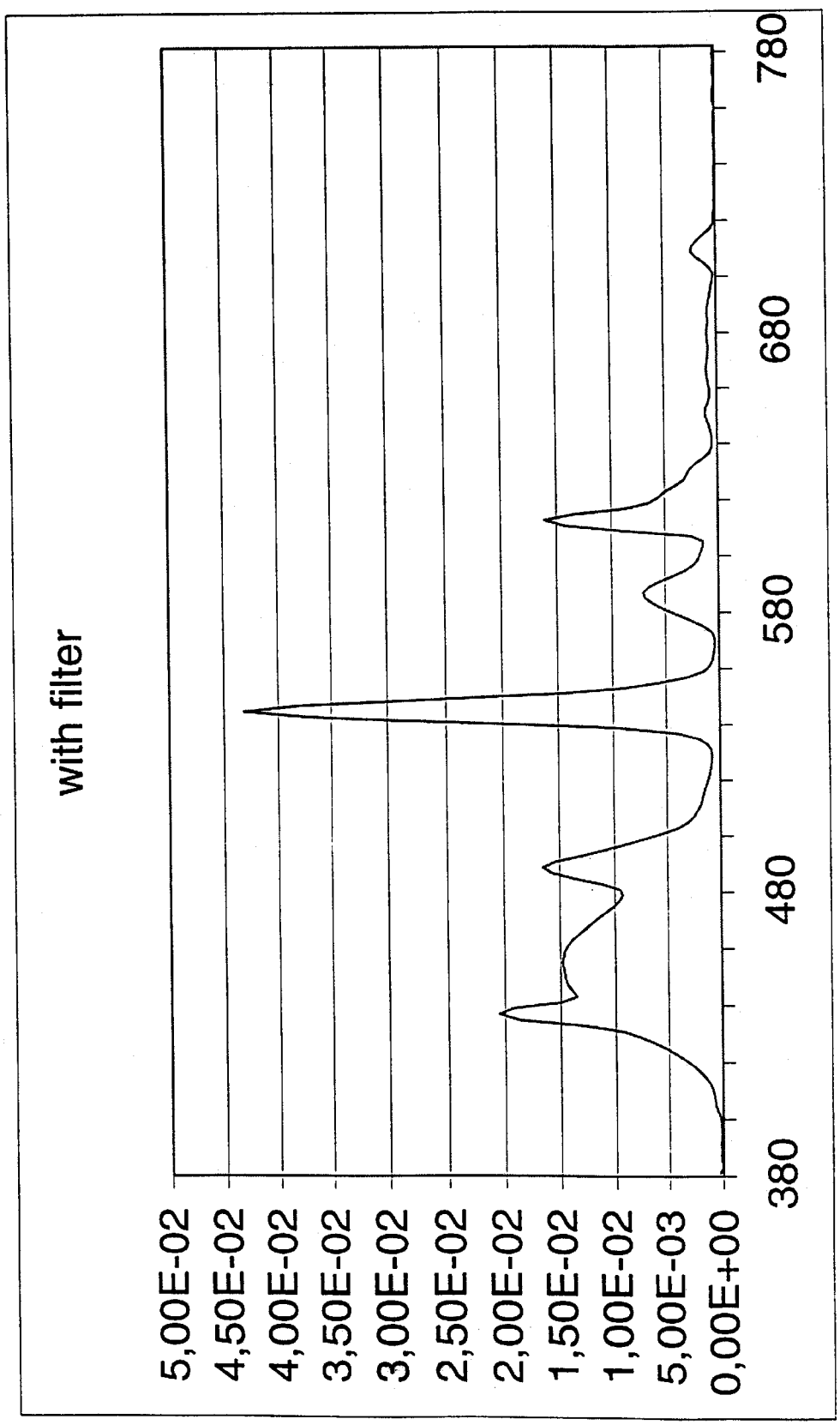
FIG. 4 shows the spectrum of the light emitted by the same display device provided with a filter having the characteristics set out in FIG. 2.

Next a filter having the transmission spectrum shown in FIG. 3 was placed in front of the viewing screen of a display device. The emission spectrum of the display device was again measured and is shown in FIG. 4.

Figure 5:
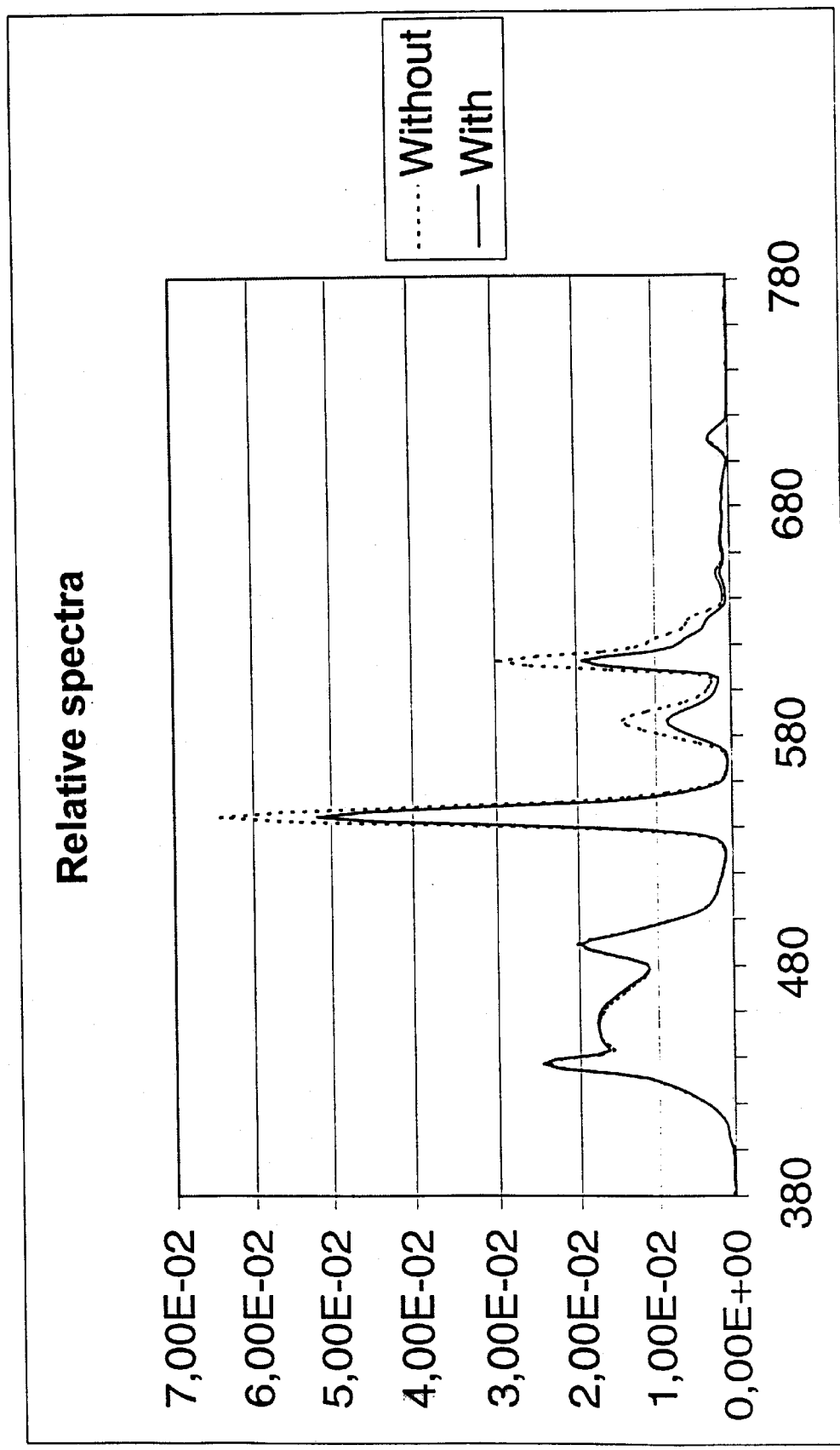
FIG. 5 shows the re-scaled spectra of FIGS. 3 and 4.

A comparison of both spectra can be made by means of FIG. 5 showing both spectra on top of eachother. The spectra with and without filter were scaled to eachother so that the blue peaks matched. By doing so, it becomes clear that the range above 520 nm is relatively more reduced than the range lower than 520 nm resulting in a perceived color shift.

Figure 6:
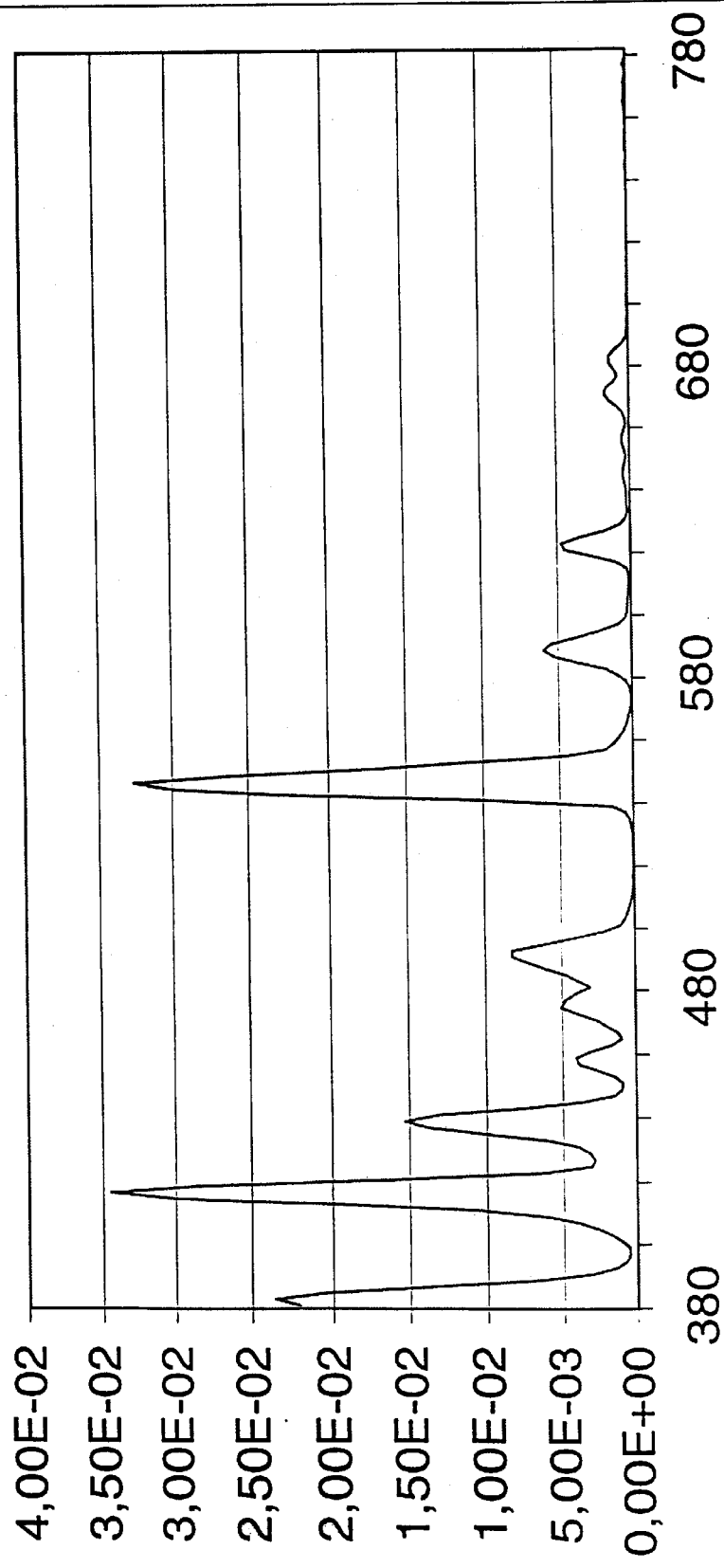
FIG. 6 shows the spectrum of a P45 phosphor.

FIG. 6 shows the spectrum of a P45 monitor.

Figure 7:
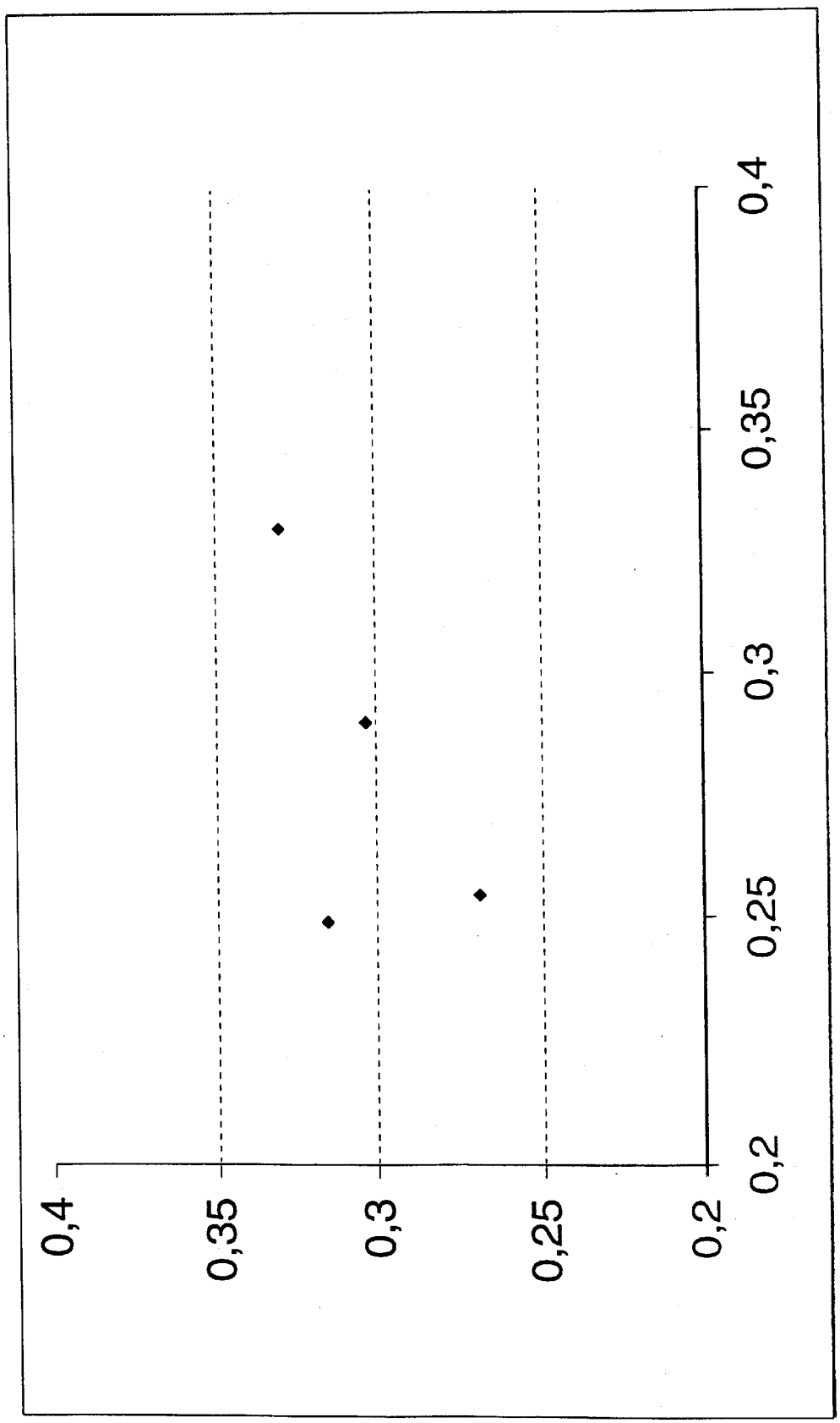
FIG. 7 shows a CIE 1931 color space and the position of some elements in that color space that are relevant for the explanation of the present invention.

FIG. 7 shows the color co-ordinates of the following items in a CIE 1931 color space.

Co-ordinates (0.33, 0.33) correspond with neutral white; (0.2901, 0.3031) correspond with the LCD display device without additional filter, co-ordinates (0.2545, 0.2693) correspond with the same LCD display device with a filter consisting of a blue base of a photographic film, co-ordinates (0.249, 0.3153) correspond with a P45 phosphor.

The color co-ordinates of the LCD device with filter are shifted towards the blue color zone in the CIE 1931 color space. The color is now similar to that which the radiologist is used to see.

What is claimed is:

1. A monochrome liquid crystal display device comprising a liquid crystal panel comprising a layer of liquid crystals, a light source arranged for uniformly illuminating said layer of liquid crystals, an electrode assembly enabling addressing of said layer of liquid crystals, said addressing being controlled by an electronic signal representation of an image to be displayed, a color filter for changing the spectrum of the light emitted by said liquid crystal panel, wherein said color filter is a base of a blue base photographic film.

2. A monochrome liquid crystal display device according to claim 1 wherein said color filter is provided between a light source and a viewer.

3. A monochrome liquid crystal display device according to claim 1 wherein said color filter is provided in front of said liquid crystal panel.

4. A monochrome liquid crystal display device according to claim 1 wherein said color filter is provided in between said light source and said liquid crystal panel.

5. A monochrome liquid crystal display device according to claim 1 wherein said color filter is provided in between a light distributor arranged for uniformly illuminating said liquid crystal panel by means of light emitted by said light source, and said panel.

6. A monochrome liquid crystal display device according to claim 1 wherein said color filter has a spectrum such that the color co-ordinates of the light emitted by said liquid crystal display device correspond with the color co-ordinates of a base of a blue base photographic film.

* * * * *